July 17, 1956     L. R. TWYMAN     2,755,060

REINFORCED FLEXIBLE WALL VALVE STRUCTURE

Filed Dec. 3, 1951     2 Sheets-Sheet 1

INVENTOR.
L. Raymond Twyman.
BY
Harness, Dickey & Pierce
ATTORNEYS.

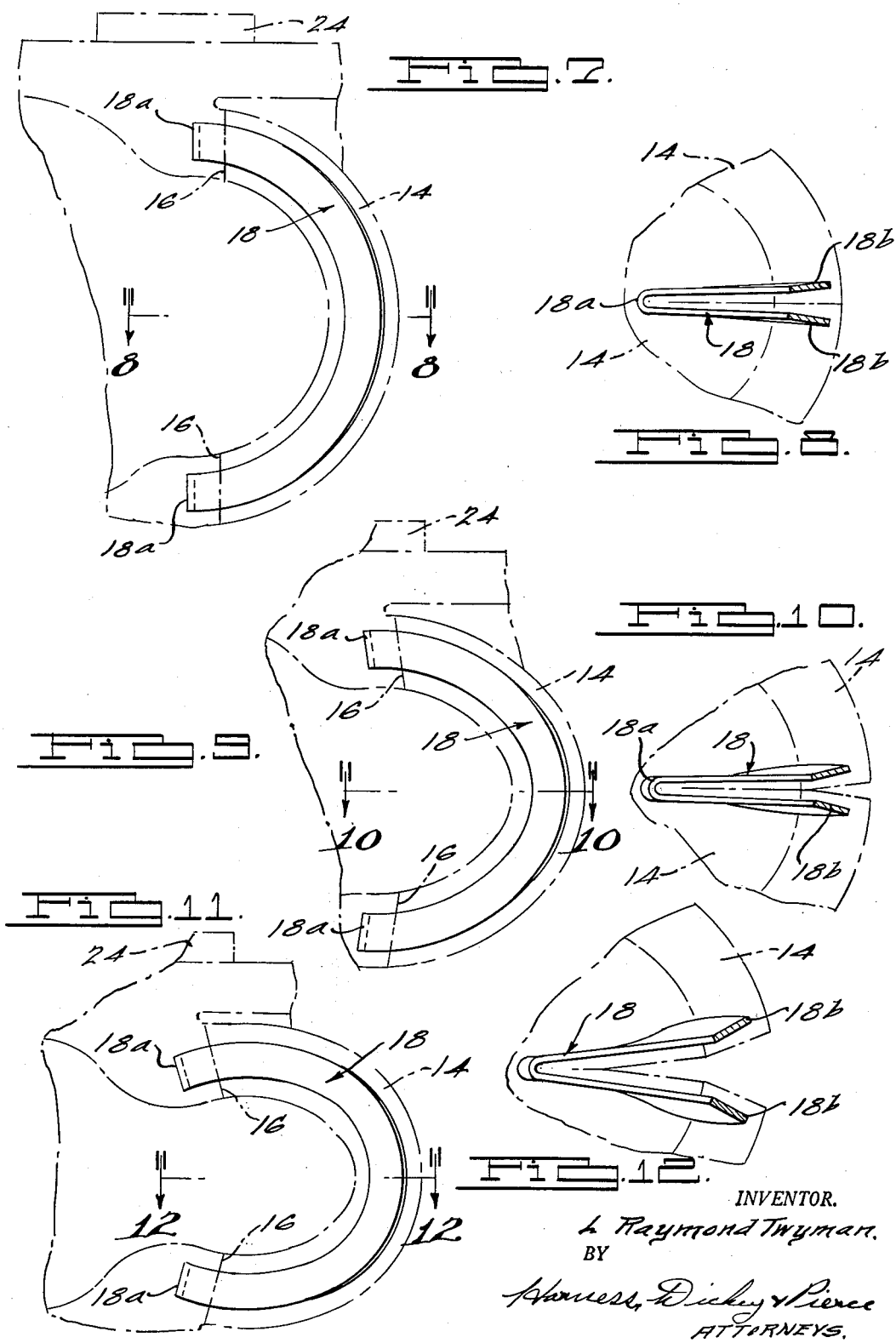

2,755,060

REINFORCED FLEXIBLE WALL VALVE STRUCTURE

L. Raymond Twyman, Bloomfield Township, Oakland County, Mich.

Application December 3, 1951, Serial No. 259,604

4 Claims. (Cl. 251—342)

This invention relates to valves of the type provided with a flexible wall having a slit therein, which opens upon flexure of the wall, and more particularly, provides such a valve which may be characterized as incorporating a reinforcing and control member embedded in the flexible wall. This member serves to reinforce the wall and to positively ensure the opening and closing actions of the slit.

This application is a continuation-in-part of applicant's prior but copending application, Serial No. 669,158, filed May 11, 1946, and now abandoned.

It is thus an object of the present invention to provide a valve of flexible material such as rubber or the like in which the opening of the fluid passage through the valve is obtained entirely by flexing action and in which no relatively movable sliding or abutting rigid parts are used at the actual surfaces where fluid flow is controlled by the valve; to provide a valve of this character which is exceedingly inexpensive, simple to construct, install and replace, and easily operated and which has a relatively long, useful life; to provide a valve of this character which when closed is automatically self-sealing under the action of applied fluid pressure; and to provide a valve of this character having a reinforcing and control element which ensures the opening and closing action of the valve and also strengthens the valve and enables it to withstand higher fluid pressures on the inlet side.

Further objects and advantages of the present invention will be apparent from the following description, reference being had to the accompanying drawing wherein a preferred form of the present invention is clearly shown.

Figure 1:
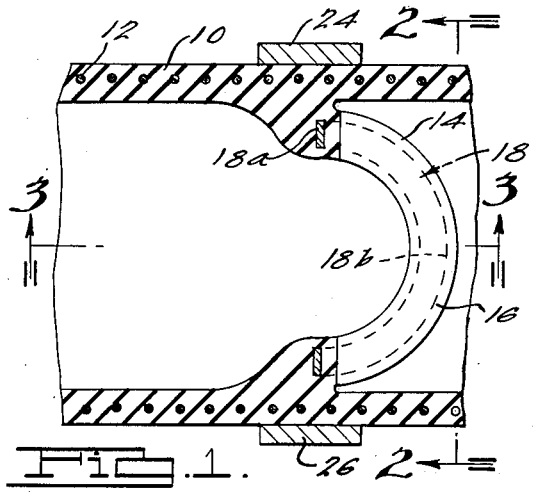
Figure 1 is a longitudinal cross section of a valve incorporating a preferred form of the present invention.
Figure 2:
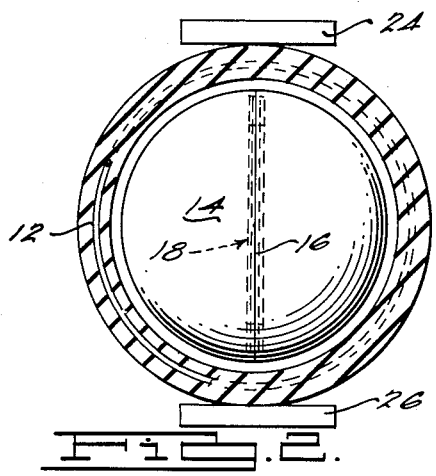
Figure 2 is a cross section on line 2—2 of Figure 1.
Figure 3:
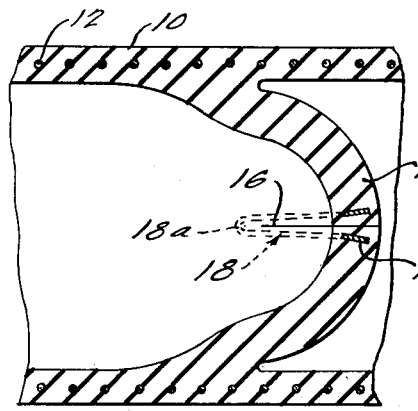
Figure 3 is a cross section on line 3—3 of Figure 1.
Figure 5:
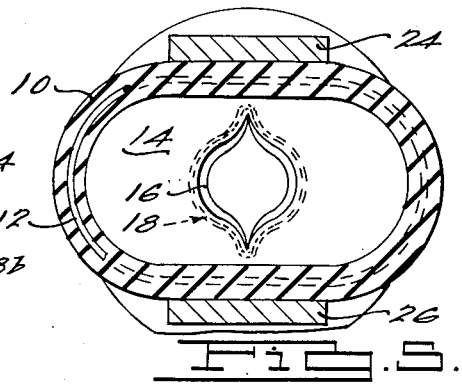
Figure 4:
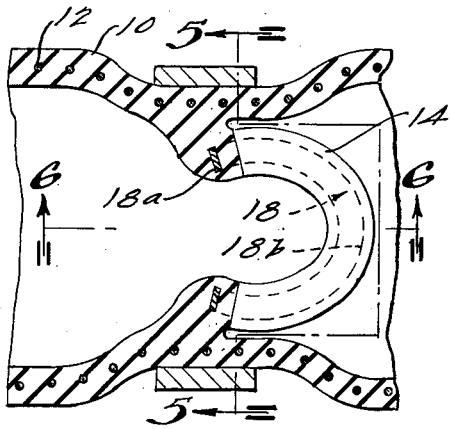
Figure 6:
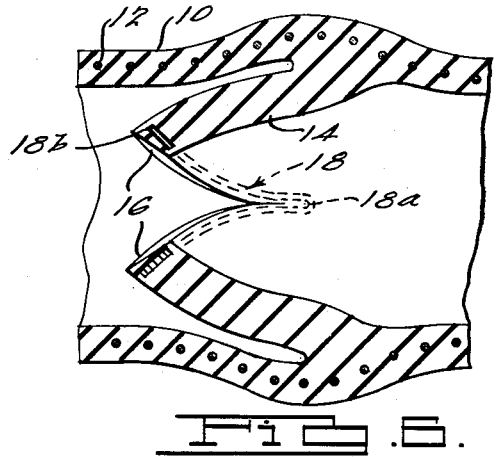

Figures 4, 5, and 6 correspond to Figures 1, 2, and 3 showing the valve in an open position.

Figures 7 through 12 are operational views particularly intended to show the behavior of the reinforcing and control member of the present invention, this member being shown in these views in full lines and the associated flexible wall being shown in phantom lines; Figures 7 and 8 show the structure in closed position, Figures 9 and 10 show the structure in still closed but partially balanced pressure relation, and Figures 11 and 12 show the structure in an intermediate open position; and Figures 8, 10, and 12 are, respectively, taken along the lines 8—8, 10—10, 12—12 of Figures 7, 9, and 11.

Referring now to Figure 1 there is shown a valve which comprises a length of tubular conduit 10 which may be formed of any flexible rubber-like material, preferably but not necessarily reinforced as indicated at 12. The upstream and downstream walls are shown as having the same thickness, but other relationships may, of course, be employed. The tube 10 is provided with a transverse flexible wall 14 which is convex (preferably but not necessarily spheroidal) on its right-hand or upstream side. The wall 14 may be of uniform thickness as illustrated or may be tapered toward or away from the center as desired. The wall 14 (with member 18, described below, in place therein), is preferably formed integrally when the conduit 10 is molded. The curvature and the thickness of the wall 14 are chosen so that (at least, when reinforced as described below) it is self-supporting against the fluid pressure on the upstream or right-hand side of the wall and is sufficiently resilient to assume the closed position of Figs. 1, 2, and 3 even in the absence of such upstream pressure. The wall is provided with a slit 16, the edges of which are normally in contact. The slit may be formed after the wall is molded by driving a thin chisel-like instrument through the wall which will form the slit without removing any material.

In accordance with the present invention, the wall 14 is provided with a reinforcing and slit-controlling member 18 which is entirely contained within and protected by the material of the wall 14 and so does not come into contact with the fluids being handled by the valve. Member 18 may be formed of a semi-rigid sheet material such as hard rubber, phosphor-bronze, beryllium copper, spring brass, spring steel, or any other suitable springy thin material.

Member 18, which appears most clearly in the operational views, Figures 7 through 12, defines two similar annular segments which are joined together at their ends 18a. Member 18 may be and preferably is formed from a single ring of material, which is folded upon itself, so that the ends 18a constitute reverse bends and have coincident axes. In accordance with the present invention at least the central portions of each annular segment are flared outwardly with respect to each other, in the relation clearly seen at 18b in Figure 8. As is described below, this outward flaring serves to positively initiate the valve opening action in response to initial valve opening flexure of the wall 14 and member 18.

For the purpose of operating the valve, any suitable mechanism may be provided which serves to compress the conduit 10 and the wall 14 endwise of the slit. Such mechanism is indicated diagrammatically by the two solid compressor members 24 and 26 and may be operated manually or by any suitable mechanism, not shown, to approach and recede from each other as desired.

In operation, when the compressors 24 and 26 are retracted, the conduit occupies its normal circular cross section at all points and the wall 14 is of the contour indicated in Figures 1, 2, and 3. Fluid pressure on the right-hand side of the wall is supported by the inherent rigidity and arched nature of the reinforced wall assembly 14—18. The member 18 being of arched construction and presenting its edge to the fluid pressure forces greatly resists collapse or inversion of wall 14 under the action of fluid pressure. In addition, the reinforcing 12 in the walls of conduit 10 prevents undue radial expansion of the conduit and of the outer portions of wall 14.

The valve may be opened by bringing the compressor members 24 and 26 toward each other. This has the effect of setting up stresses in the wall assembly 14—18 which tend to open the slit as shown in Figures 4, 5, and 6. In the early stages of movement of compressors 24—26, these stresses are not sufficient to overbalance the forces of fluid pressure, but, as the compression increases, the point is reached where pressure forces are overbalanced and as the slit starts to open, fluid enters the same from the right-hand side of Figure 1 and thereafter the slit 16 opens and allows flow therethrough. The action of member 18 in causing this valve opening may best be understood with reference to Figures 7 through 12.

The initial movements toward each other of compressor members 24 and 26 set up tensional stresses in the radially outer fibres of member 18 and set up compressive stresses in the radially inner fibres thereof. These stresses cause the radially outer portion of each annular segment of member 18 to tilt out of the general plane of the corresponding segment. The slight initial flare between these portions ensures that the tilting forces will be in respectively opposite directions and will cause the segments to move away from each other and increase the flare angle. This relationship is shown in Figures 9 and 10. This initial separation causes the radially outer portions of the slit 16 to open, which action immediately admits fluid under pressure to the opposed faces of the slit, thereby at least in part counterbalancing the fluid pressure forces which, in the closed position, act to hold the slit closed. By virtue of this positively induced initial opening of the slit 16, the slit opening action is initiated at a quite early stage of the movement of compressor members 24 and 26 and the forces applied to compressors 24—26 do not need to be as great.

The continued movement of compressor members 24 and 26 increases the separation of the annular segments of member 18 and increases the flare angle therebetween and ultimately causes the valve to open and allow flow therethrough, as shown in Figures 11 and 12.

Annular members as described above have what may be termed an over-center action. That is to say, in the early stages of a valve opening movement, increments of movement of the bends 18a towards each other cause the flare angle between portions 18b to increase somewhat more rapidly than the rate of separation of the main bodies of the two annular segments. As the reverse bends are brought closer and closer together, however (to, for example, approximately the position of Figures 11 and 12), a critical point is reached at which, in response to a very small additional approaching movement of the reverse bends 18a, the two segments of member 18 quickly tend to snap to a wide open position. The degree of this final snapping movement is, of course, limited by the material of the wall 14. Even when in the fully open position, however, the member 18 tends to reassume the closed position and, consequently, upon retraction of the compressors 24 and 26 to the normal position of Figures 1, 2, and 3, member 18 applies a positive biasing force to the wall 14 and causes the slit to reclose. This reclosing of the slit is facilitated by the fluid pressures acting against the upstream face of the wall 14.

It will be seen that in the broader aspects of the invention, flexibility is all that is required of the wall 14 and conduit 10, in which event the opening action is due almost entirely to the action of member 18. In this event also, in the absence of fluid pressure, the closing movement is caused almost entirely by the resilient characteristics of member 18. Fluid pressures within the valve act to restore conduit 10 to its initial circular cross-section and, by restoring bends 18a to their normal spacing, these forces act to restore member 18 to its normal "closed" condition. Thus, such fluid pressures aid the valve closing action.

Preferably, however, the wall 14 and conduit 10 are formed of material having resilient characteristics. As such, they inherently tend to open the slit when flexed, as above described, and tend to reclose the slit when the flexing forces are relieved. In such cases, the reinforcing and control member augments the normal opening and closing tendencies of the wall 14, and, by ensuring separation between the radially outer wall portions of the slit, ensures a prompt initial balancing of the fluid pressure forces and a positive opening action.

It will be seen that the present device provides a valve in which there are no sliding or rotating parts requiring packing. The valve is, furthermore, pressure sealing in that when closed, the action of fluid pressure tends to more tightly close the lips of the slit 16 and, in addition, the valve is not liable to derangement from the accumulation of deposits or from corrosion or erosion. Moreover, the reinforcing member, when shaped as described, has the characteristic of multiplying the external force by a large ratio so that a very large spreading force at 18b can be produced by a relatively small force applied across members 24—26. This permits use of the valve to handle very high pressures without requiring abnormally high operational forces across members 24—26.

While the form of the invention as herein disclosed constitutes a preferred form, it is to be understood that other forms might be adopted, all coming within the scope of the claims which follow.

What is claimed is:

1. A valve element for controlling fluid flow comprising a flexible wall portion slitted to define an opening therethrough, a reinforcing and control member of semi-rigid resilient material carried by and held against movement along said wall portion and surrounding said slit, said wall portion being convex in cross section and self-supporting against fluid pressures acting against the convex face of said wall portion, said wall portion and member being deformable by opposed forces applied externally of said wall portion at opposite sides thereof, said member including a pair of generally parallel arcuately shaped segments joined at their ends and acting in response to said deforming forces to move said segments apart to positively open said slit and acting when said force is relieved to move said segments together to reclose said slit.

2. A valve for controlling fluid flow comprising a nonplanar wall extending across a fluid conduit and protruding longitudinally of the conduit toward the upstream side thereof, said wall having a slit therethrough the edges of which are urged into contact by fluid pressure on the upstream side and means for deforming the wall to compress it in a direction endwise of the slit to open the slit against said fluid pressure, said wall and the conduit walls adjacent thereto being formed of flexible rubberlike material, and a reinforcing and control member of semirigid sheet material comprising two generally parallel arcuately shaped segments joined at their ends and embedded in the wall around said slit, said member acting to resist deformation under the force of fluid pressure on the upstream side and acting when compressed endwise of the slit to open by separation of the parallel segment portions and thereby positively open the slit.

3. A valve element for controlling fluid flow comprising a flexible wall portion slitted to define an opening therethrough, a reinforcing and control member of semi-rigid resilient material carried by and held against movement along said wall portion and surrounding said slit, said wall portion being convex in cross section and self-supporting against fluid pressures acting against the convex face of said wall portion, said wall portion and member being deformable by externally applied force, said member acting in response to said deforming force to positively open said slit and acting when said force is relieved to reclose said slit, said member comprising two generally flat segments disposed generally parallel to each other on opposite sides of said slit but with the upstream edges thereof spaced farther apart than the downstream edges thereof when the slit is closed so as to insure that said externally applied deforming force shall cause said segments to tend to move farther away from each other.

4. A valve element for controlling fluid flow comprising a flexible wall portion slitted to define an opening therethrough, a reinforcing and control member of semi-rigid resilient material carried by and held against movement along said wall portion and surrounding said slit, said wall portion being convex in cross section and self-supporting against fluid pressures acting against the convex face of said wall portion, said wall portion and member being deformable by externally applied force, said member acting in response to said deforming force to positively open said slit and acting when said force is relieved to reclose said slit, said member being composed of a single ring of material symmetrically folded upon itself and having a slight flare angle between the opposed intermediate portions thereof when the slit is closed.

References Cited in the file of this patent

UNITED STATES PATENTS

| 132,006 | Harris | Oct. 8, 1872 |
| 156,908 | Brock | Nov. 17, 1874 |
| 274,447 | Kennish | Mar. 20, 1883 |
| 1,238,521 | Janish | Aug. 28, 1917 |
| 2,241,125 | Girard | May 6, 1941 |
| 2,283,835 | Weaver | May 19, 1942 |
| 2,314,767 | Burrell | Mar. 23, 1943 |
| 2,446,571 | Browne | Aug. 10, 1948 |
| 2,551,038 | Nebout | May 1, 1951 |

FOREIGN PATENTS

| 23,843 | Great Britain | 1892 |